Dec. 9, 1969  W. M. ROBINSON  3,483,448
CAPACITOR INCLUDING INTERNAL HEAT DISSIPATING STRUCTURE
Filed Jan. 25, 1968
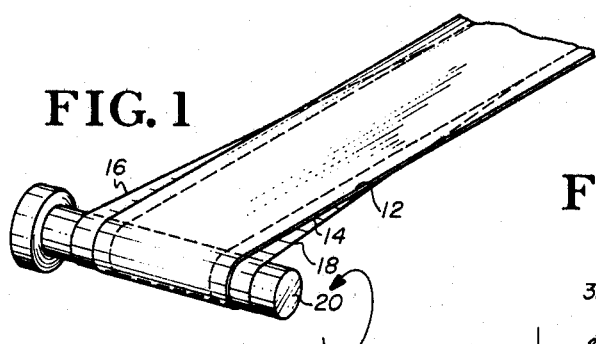
FIG. 1
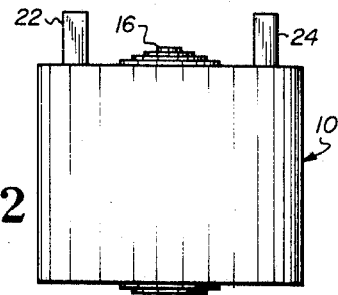
FIG. 2
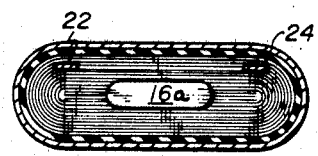
FIG. 4
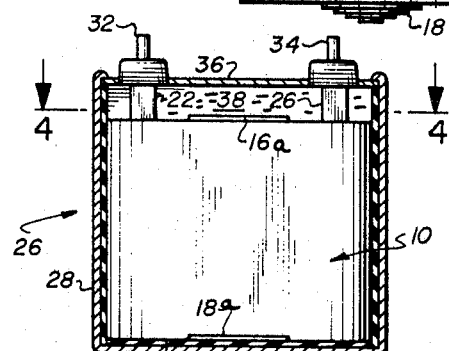
FIG. 3
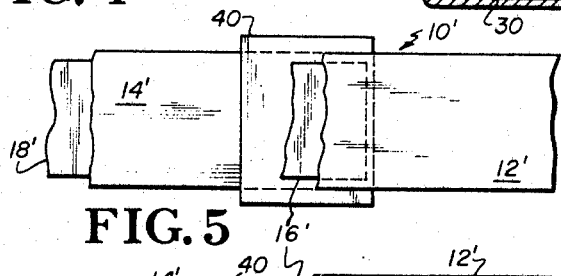
FIG. 5
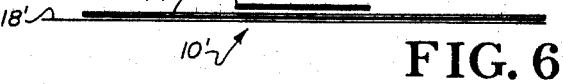
FIG. 6
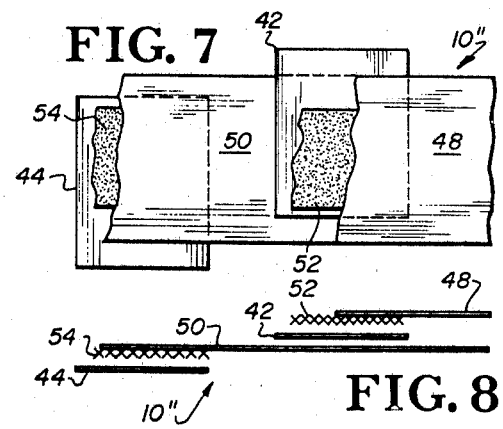
FIG. 7
FIG. 8
INVENTOR.
WILLIAM M. ROBINSON
BY
*Richard W. Rabkin*
ATTORNEY

United States Patent Office 3,483,448
Patented Dec. 9, 1969

3,483,448
CAPACITOR INCLUDING INTERNAL HEAT DISSIPATING STRUCTURE
William M. Robinson, New Bedford, Mass., assignor to Cornell-Dubilier Electric Corporation, a corporation of Delaware
Filed Jan. 25, 1968, Ser. No. 700,431
Int. Cl. H01g 1/08, 7/04, 1/00
U.S. Cl. 317—243                                      8 Claims

ABSTRACT OF THE DISCLOSURE

A wound capacitor section in a container has a means for dissipating internally generated heat. The means is distinct from the terminals of the capacitor.

---

This invention relates to electrical capacitors and more particularly to convolutely wound electrical capacitors.

One of the most deleterious influences on capacitor life is the heat buildup which occurs during operation. The heat developed is due to the electrical power losses and produces a temperature rise in the wound capacitor section. Heat is uniformly developed along the capacitor winding but is unable to escape from the innermost regions thus producing a temperature gradient in the capacitor with the portion at the start of the winding operating at the highest temperature. It is well known that high temperatures seriously shorten capacitor life. A directly related mode of capacitor failure is due to the fact that the impregnant becomes chemically unstable at elevated temperatures. The deterioration or decomposition of the impregnant together with the high temperature to which the dielectric is exposed ultimately results in dielectric failure. It is an object of this invention to provide capacitors having improved life characteristics. It is another object of this invention to reduce the operating temperature of wound section capacitors. It is a further object of this invention to provide a capacitor having a lower operating temperature at the start of the winding with a minimum increase in cost.

Many solutions have been proposed heretofore for the problem of heat buildup in capacitors. Most have proven unsatisfactory or uneconomic. For example, it is well known in the art that internal heat may be dissipated where one or both electrodes are laterally displaced for their full length to extend beyond the edges of the dielectric. However, this extended foil construction is considered unduly expensive due to the fact that the extended portions of the foils are not "active" in the sense of contributing to the capacitance of the unit. Where a winding includes electrodes that are over 1000 inches long, the economic significance becomes apparent. Also, a complex structure is required to insulate the fully extended electrode from the capacitor enclosure while providing electrical connection thereto and still maintaining the desired heat dissipation characteristics. It is another object of this invention to provide a wound capacitor section having improved heat dissipation characteristics. It is still another object of this invention to provide improved methods for manufacturing capacitors having improved characteristics which methods utilize existing apparatus and technology.

The above and other objects, advantages and novel features of the invention will become apparent from consideration of the following description taken in conjunction with the accompanying drawings in which:

FIG. 1 is a perspective view of a portion of the winding apparatus for producing one embodiment of the invention to be described in detail below;

FIG. 2 is a front elevation of a wound and flattened capacitor section produced according to teachings of this invention, being one embodiment thereof;

FIG. 3 is a front elevation, in partial section, of a complete capacitor according to FIG. 2;

FIG. 4 is a view along the line 4—4 of FIG. 2;

FIGS. 5 and 6 are plan and elevational representations respectively of yet another embodiment of the invention; and FIGS. 7 and 8 are plan and elevational representations, similar to that of FIGS. 5 and 6 of a still another embodiment of the invention.

Capacitors of the type herein contemplated include a plurality of interspersed layers of dielectric and conductive materials wound into a roll known in the art as a "section" or "winding." Referring to the drawings, initial steps in preparation of and the construction of a wound capacitor section 10 are shown. The capacitor section includes plural sheets of dielectric 12, 14, as for instance kraft paper of capacitor grade, and interspersed metal electrodes 16, 18. The layers of foil and dielectric are brought to the winding mandrel 20, forming part of the winding machine not shown, individual supplies thereof in a manner well known in the art. Customarily the layers are arranged in the relative position which they are to assume during the winding operation, and, hence, in the finished section. In capacitors of the non-extended foil type the foils are positioned well inside the adjacent lateral edges of the dielectric layers. In the extended foil construction the foils extend beyond one or the other of the dielectric lateral edges being "within" or "margined" at the opposite dielectric edge. However, as shown in FIG. 1 there is a departure from the aforementioned customary winding techniques. Here, at the start of the winding the electrodes 16, 18 are, as also in the case of the extended foil type, oppositely disposed with respect to the lateral margins of the dielectric layers 12, 14. In producing the non-extended foil section the foils 18, 16 would have been positioned within the opposed lateral edges of the dielectric layers 12, 14 and definitely margined from those lateral edges. As indicated in FIG. 1 the materials are drawn to the winding mandrel and arranged as though the extended foil type was to be produced and once the foils have ben clamped in the position shown in the drawings, by well-known structures utilized for this purpose heretofore, the winding operation commences. However, as the mandrel begins to rotate counterclockwise the foil electrodes are moved inward of the lateral margins of the dielectric layers to the position normally assumed in non-extended foil types. Since the layers are fed along parallel paths from the supplies thereof it is possible to initially deflect them from their normal path by clamping them in an offset manner at the mandrel as illustrated. The result of this arrangement is the provision of the inward movement of the foils once the winding operation begins. As a result a diminishing lateral amount of the foil is in the extended position with each subsequent turn of the winding mandrel until the foil is entirely margined as in the case of a non-extended winding. At a subsequent point in the winding operation tap straps 22 and 24 are inserted and connect electrically with foils 16 and 18, respectively. It will be noted that, contrasted with the extended foil capacitors, substantially all of the foil material in the embodiment described above is "active"; that is, it contributes to the capacitance of the winding. The small length of foil which extends from the winding to the exterior thereof is positioned at the center of the completed section and, advantageously, acts as a path of heat conduction from the center. Thus the illustrated embodiment combines the desirable features of the extended and non-extended foil types of capacitor without requiring new or different winding apparatus.

The beneficial results of heat removal from the central portion of the capacitor winding are well known and very much desired. For instance, the removal of the "hot spot" results in reduced deterioration of the impregnant and in lower dielectric temperature.

In the completed capacitor 26 of FIG. 3, the extended portions of foils 16 and 18 have been flattened at 16a, 18a against the exterior end faces of the winding 10. They are each separated from the opposite foil by virtue of the "margining" of the foils at their lateral edges within the winding. The section 10 is placed within an enclosure 28, as of metal, in which a kraft insulator lining 30 has been pre-positioned. The tap straps 22 and 24 are connected to terminals 32, 34 carried by the cover 36. Cover 36 is joined to the enclosure 28 and subsequently the capacitor 26 is vacuum impregnated and sealed. The impregnant is indicated at 38 in FIG. 3. Heat generated at or close to the center of the section 10 is readily conveyed to the bulk of the impregnant by the foils 16, 18. The impregnant in turn is cooled by contact with enclosure 28 that is exposed to the ambient.

The advantages of the embodiment of FIGS. 1 to 4 may also be obtained by the lateral displacement of only one of the foils rather than the lateral displacement of both. In this condition then the heat conduction path to the exterior is somewhat reduced. Nonetheless a significant contribution to the reduction of the internal temperature can be made.

While the presently preferred embodiment of the invention has been described above, certain of the advantages thereof may be obtained in other embodiments. Referring to FIGS. 5 and 6, there is illustrated a capacitor which may be fabricated according to standard manufacturing techniques. Similar elements bear the same reference numerals appropriately primed. In this embodiment a heat conductive overlay 40, as of foil, is shown in engagement with one of the electrodes 16' at the start of the winding 10'. The foil 40 is wider than the dielectric layers 12', 14' and extends beyond their lateral margins. Overlay 40 is electrically insulated from foil 18' of opposite polarity by the dielectric layers. Overlay 40 is inserted at the start of the winding and is effective in drawing heat from the interior of the wound section. It will be understood by those skilled in the art that the overlay foil 40 may extend beyond one margin of the capacitor winding 10' or, as illustrated, may extend beyond both margins.

In still another embodiment, particularly suited to capacitors utilizing metallized electrodes, shown in FIGS. 7 and 8 two overlays 42, 44 are employed. The overlays are wider than the dielectric backing layers 48, 50 and extend beyond opposite margins of the capacitor winding 10". Each of the foil, thermally conductive, overlays 42, 44 is connected to a respective one of the electrodes 52, 54. Electrodes 52, 54 are a layer of metallized or deposited conductor on the dielectric layers 48, 50. The use of a thermally conductive overlay is particularly advantageous in such metallized capacitor constructions since it provides the means for extraction of heat from the interior of the winding otherwise not available due to the thinness of the metallized layer.

While several embodiments of the invention have been shown and described it will be readily understood by those skilled in the art that various changes and modifications may be made without departing from the spirit and scope of the invention.

What is claimed is:
1. A capacitor including a container and a capacitor section therein, said container including terminal means, said capacitor section comprising a convolutely wound array of layers of dielectric material and interspersed layers of conductors and heat transfer means adjacent the start of said wound array and having at least a portion thereof in intimate heat conduction with a confronting layer of dielectric material, said heat transfer means having at least a second portion extending axially of said wound array beyond the latera margins of said dielectric layers thereof adjacent the center of said section and a tap strap connected to a respective layer of conductor and to said terminal means.

2. A capacitor according to claim 1 wherein said heat transfer means includes at least one of said layers of conductor, said layer of conductor being laterally displaced adjacent the center of said section so as to provide a portion extending beyond the lateral edge of said confronting layer of dielectric whereby a heat transfer path of high thermal conductivity adjacent the center of said section is provided.

3. A capacitor according to claim 1 wherein said heat transfer means includes a pair of layers of conductor and wherein said conductors are oppositely displaced with respect to said confronting layers of dielectric so as to provide thermal paths of high conductivity at the opposite ends of said section adjacent the center thereof.

4. A capacitor comprising a convolutely wound array of layers of dielectric material and interspersed layers of conductor and heat transfer means adjacent the center of said wound section and extending beyond the lateral edges of said layers of dielectric to the ambient surrounding said capacitor section, said heat transfer means being an active capacitance element.

5. A capacitor section in accordance with claim 1 wherein said heat transfer means includes an inserted overlay of foil interposed between one conductor layer and the confronting layer of dielectric material and extending beyond a lateral margin of the dielectric layer.

6. A capacitor section in accordance with claim 5 wherin said overlay of foil extends beyond the opposite margins of said dielectric layers.

7. A capacitor section in accordance with claim 5 wherein said conductor layer is in the form of a metallized layer on said dielectric layer.

8. A capacitor section in accordance with claim 1 wherein said heat transfer means includes an overlay of foil in contact with each of said conductor layers, said overlay foils extending beyond opposite ends of said section.

References Cited
UNITED STATES PATENTS

| | | | |
|---|---|---|---|
| 971,667 | 10/1910 | Dean | 317—260 |
| 1,713,867 | 5/1929 | Dublier | 317—261 |
| 2,232,320 | 2/1941 | Georgieu | 317—260 X |
| 3,271,642 | 8/1966 | Baldwin | 317—260 |
| 3,306,798 | 2/1967 | Gaenge | 317—260 X |

FOREIGN PATENTS 853,846 11/1960 Great Britain.

ELLIOT A. GOLDBERG, Primary Examiner

U.S. Cl. X.R,

317—247, 260